US010267349B2

(12) United States Patent
Apostolopoulos et al.

(10) Patent No.: US 10,267,349 B2
(45) Date of Patent: Apr. 23, 2019

(54) FASTENER

(71) Applicant: Paul Kristen, Inc., Tonawanda, NY (US)

(72) Inventors: Lambros Apostolopoulos, East Aurora, NY (US); Brian Bortz, North Tonawanda, NY (US)

(73) Assignee: PAUL KRISTEN, Inc., Tonawanda, NY (US)

( * ) Notice: Subject to any disclaimer, the term of this patent is extended or adjusted under 35 U.S.C. 154(b) by 368 days.

(21) Appl. No.: 15/188,409

(22) Filed: Jun. 21, 2016

(65) Prior Publication Data

US 2017/0363135 A1    Dec. 21, 2017

(51) Int. Cl.
*F16B 35/06*    (2006.01)
*F16B 37/12*    (2006.01)
*F16B 13/08*    (2006.01)

(52) U.S. Cl.
CPC .......... *F16B 35/06* (2013.01); *F16B 13/0808* (2013.01); *F16B 37/12* (2013.01)

(58) Field of Classification Search
CPC ................. F16B 13/0808; F16B 21/12; Y10T 29/49741; Y10T 29/49947
(Continued)

(56) References Cited

U.S. PATENT DOCUMENTS 581,693 A    5/1897 Capen
644,115 A    2/1900 Watermann et al.
(Continued)

FOREIGN PATENT DOCUMENTS

CN    104373439 A    2/2015
DE        51544    4/1890
(Continued)

OTHER PUBLICATIONS

Search Report for corresponding European application EP 17177245, dated Oct. 18, 2017, 2 pages.
(Continued)

*Primary Examiner* — Jason L Vaughan
*Assistant Examiner* — Amanda J Meneghini
(74) *Attorney, Agent, or Firm* — James C. Simmons

(57) ABSTRACT

A fastener which comprises a tubular member, a sleeve, a spring, a shank, and an elongate head. A lower end portion of the shank extends through the tubular member to threadedly engage a lower part. The elongate head rotates within a slot in the upper end of the shank between a first position extending longitudinally of the shank so that it can receive an upper part to be attached to the lower part and a second position extending radially of the shank to prevent removal of the upper part. The shank is received within the sleeve and has a pair of slots in its upper end which are alignable with the shank slot. The sleeve is biased to an upper position by the spring, which is in the tubular member. When the sleeve is in a position wherein it is biased upwardly, the sleeve partially covers the shank slot to prevent rotation of the elongate head between the first and second positions. The sleeve can be pushed downwardly against the force of the spring when the shank is sufficiently loosened to substantially uncover the shank slot thereby allowing rotation of the elongate head between the first and second positions.

23 Claims, 8 Drawing Sheets

(58) Field of Classification Search
USPC .................................. 411/340, 344, 347, 351
See application file for complete search history.

(56) References Cited

U.S. PATENT DOCUMENTS

| | | | |
|---|---|---|---|
| 1,075,759 A | 10/1913 | Burridge |
| 1,340,470 A | 5/1920 | Whitmore |
| 1,346,578 A | 7/1920 | Windsor |
| 2,224,522 A | 12/1940 | Peterson |
| 2,578,515 A | 12/1951 | Crafton |
| 2,660,083 A | 11/1953 | Tyson |
| 2,758,498 A | 8/1956 | Johnson |
| 3,534,650 A | 10/1970 | Kubokawa |
| 3,673,910 A | 7/1972 | Collister |
| 3,933,390 A | 1/1976 | Barrett et al. |
| 4,739,543 A | 4/1988 | Harris, Jr. |
| 4,793,755 A | 12/1988 | Brown |
| 4,997,327 A | 3/1991 | Cira |
| 5,042,888 A | 8/1991 | Shinjo |
| 5,098,433 A | 3/1992 | Freedland |
| 5,466,015 A | 11/1995 | Berenter |
| 5,507,611 A | 4/1996 | Collister |
| 5,730,248 A | 3/1998 | Apostolopoulos |
| 5,897,300 A | 4/1999 | Luedtke |
| 5,921,346 A | 7/1999 | Apostolopoulos |
| 6,003,634 A | 12/1999 | Apostolopoulos |
| 6,135,240 A | 10/2000 | Apostolopoulos |
| 6,138,793 A | 10/2000 | Aoostol000ulos |
| 6,227,331 B1 | 5/2001 | Aoostol000ulos |
| 6,264,002 B1 | 7/2001 | Apostolopoulos |
| 6,302,237 B1 | 10/2001 | Apostolopoulos |
| 6,386,319 B2 | 5/2002 | Apostolopoulos |
| 6,523,644 B2 | 2/2003 | Apostolopoulos |
| 6,685,408 B1 | 2/2004 | Fusco |
| 7,198,306 B2 | 4/2007 | Ambs |
| 7,316,534 B2 | 1/2008 | Hohmann et al. |
| 7,896,179 B2 | 3/2011 | Hanaway |
| 8,112,855 B1 | 2/2012 | Balliew |
| 8,123,001 B1 | 2/2012 | Apostolopoulos et al. |
| 8,393,841 B1 | 3/2013 | Angeloni |
| 9,115,744 B1 | 8/2015 | Bulow |
| 9,217,451 B2 | 12/2015 | Apostolopoulos et al. |
| 2006/0182514 A1 | 8/2006 | Ito |
| 2008/0003077 A1* | 1/2008 | Anderson ............ F16B 19/109 |
| | | | 411/347 |
| 2010/0145396 A1 | 6/2010 | Thornes |
| 2011/0085854 A1 | 4/2011 | Apostolopoulos et al. |
| 2017/0096823 A1 | 4/2017 | Apostolopoulos et al. |

FOREIGN PATENT DOCUMENTS

| | | |
|---|---|---|
| GB | 222904 | 10/1924 |
| GB | 554416 | 7/1943 |
| GB | 552100 | 3/1945 |
| GB | 2119748 A | 11/1983 |

OTHER PUBLICATIONS

Examination opinion for corresponding European application EP 17177245, 3 pages.
Claims to which the Search Report and Opinion for corresponding European application EP 17177245 were directed, 7 pages.

* cited by examiner

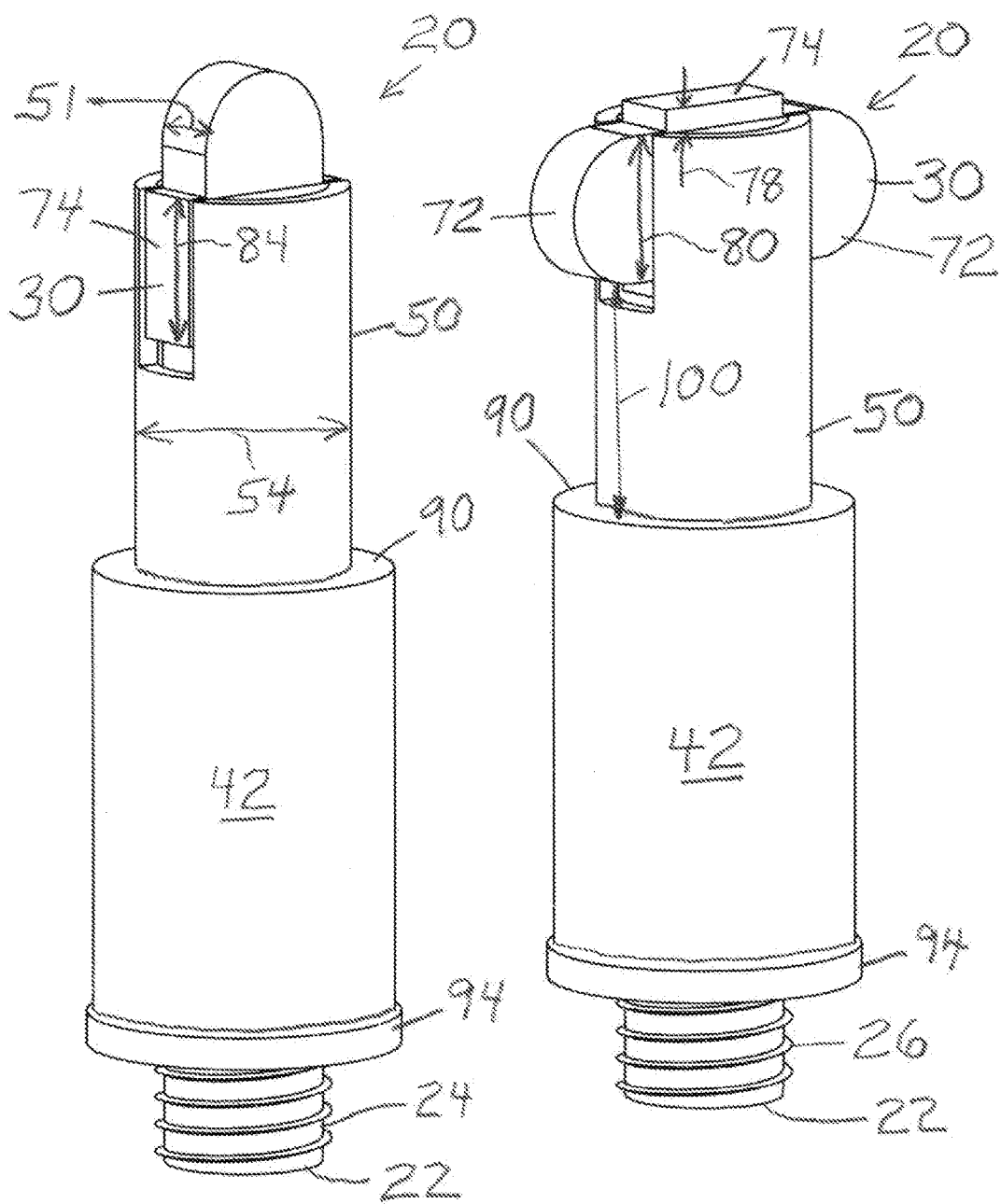

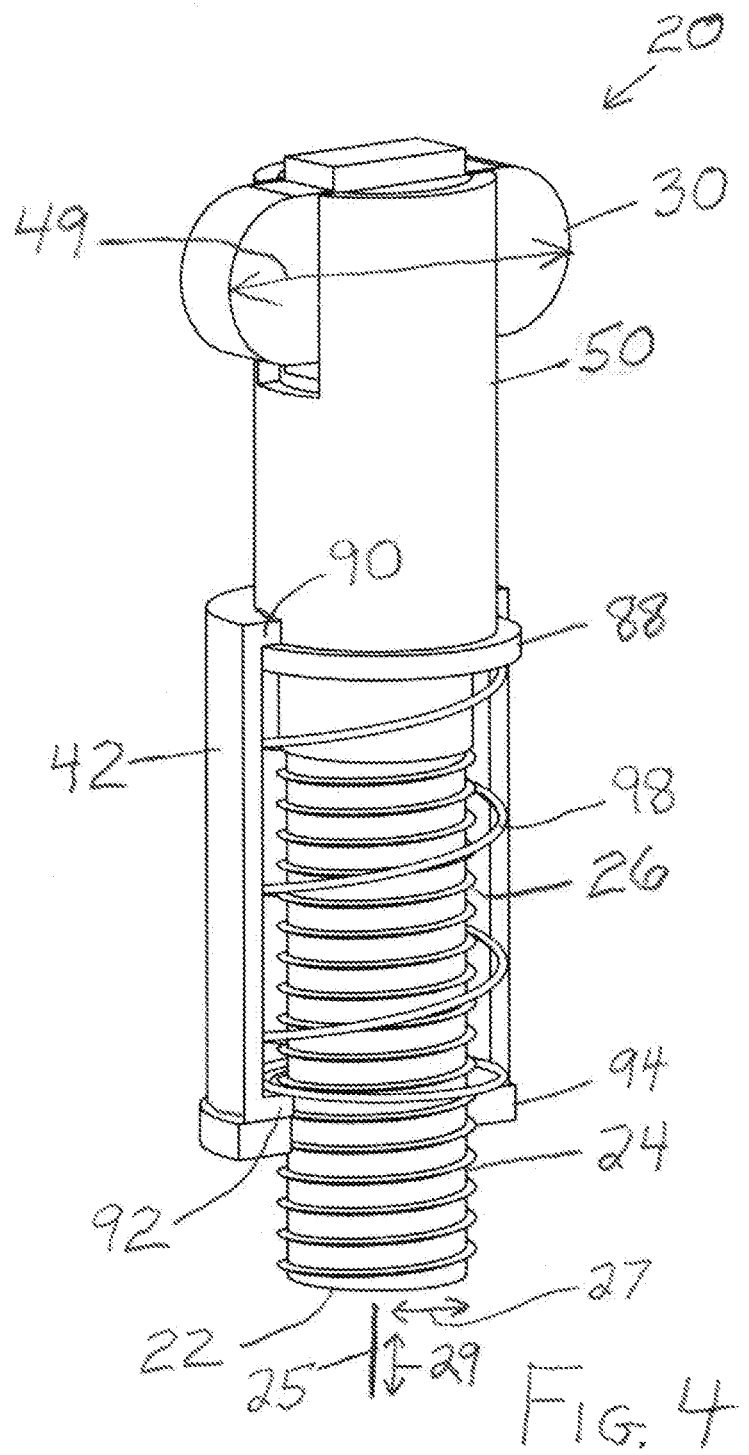

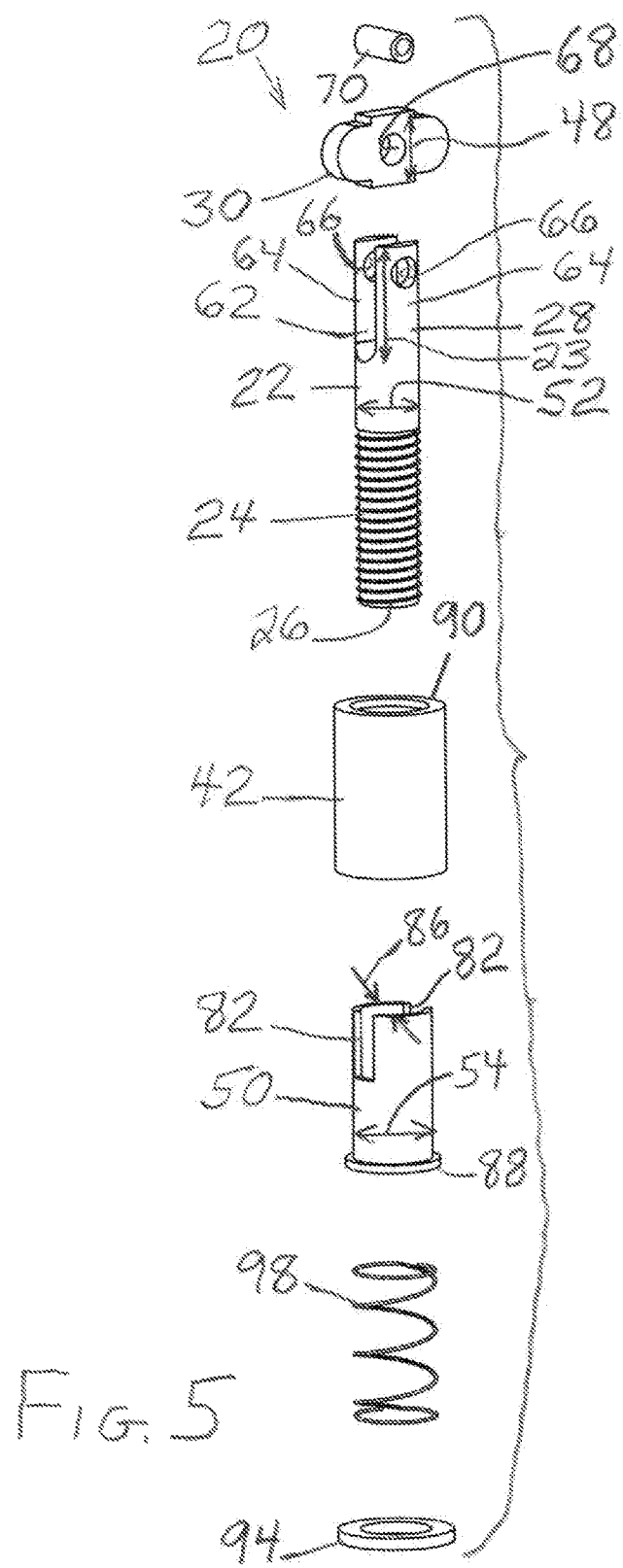

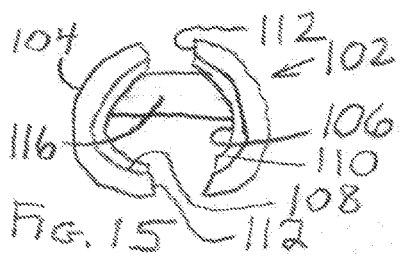
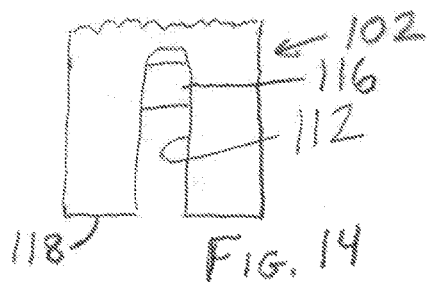
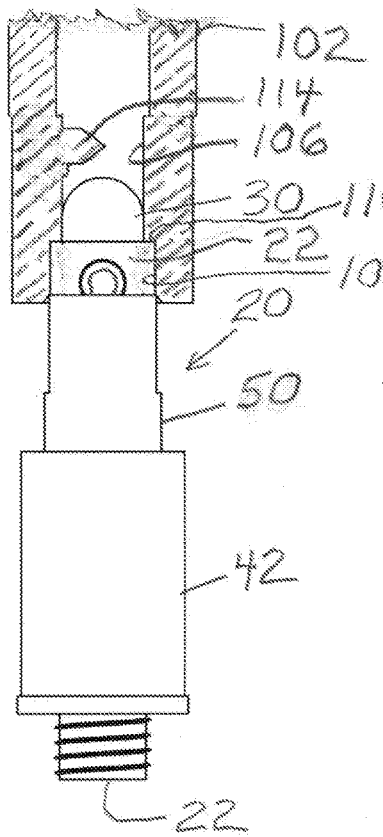
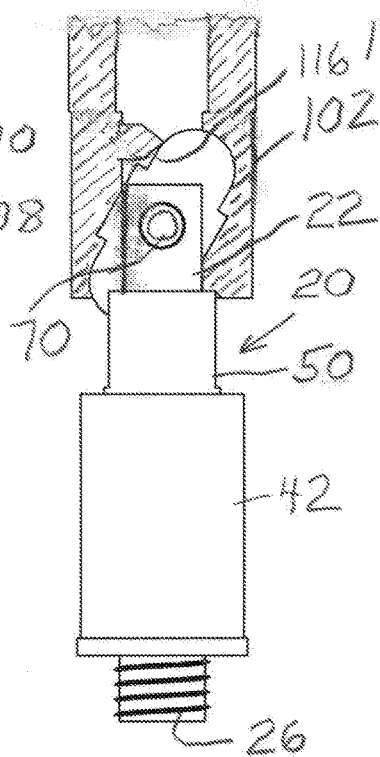
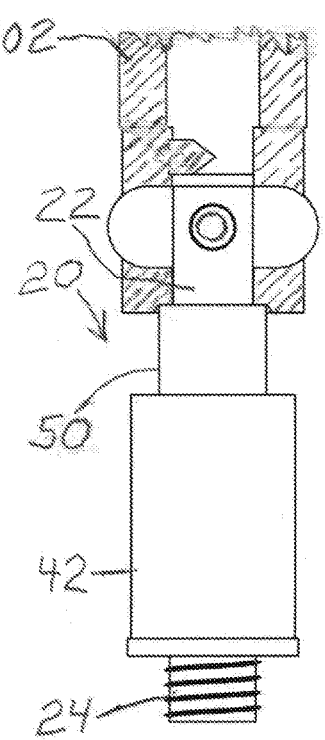

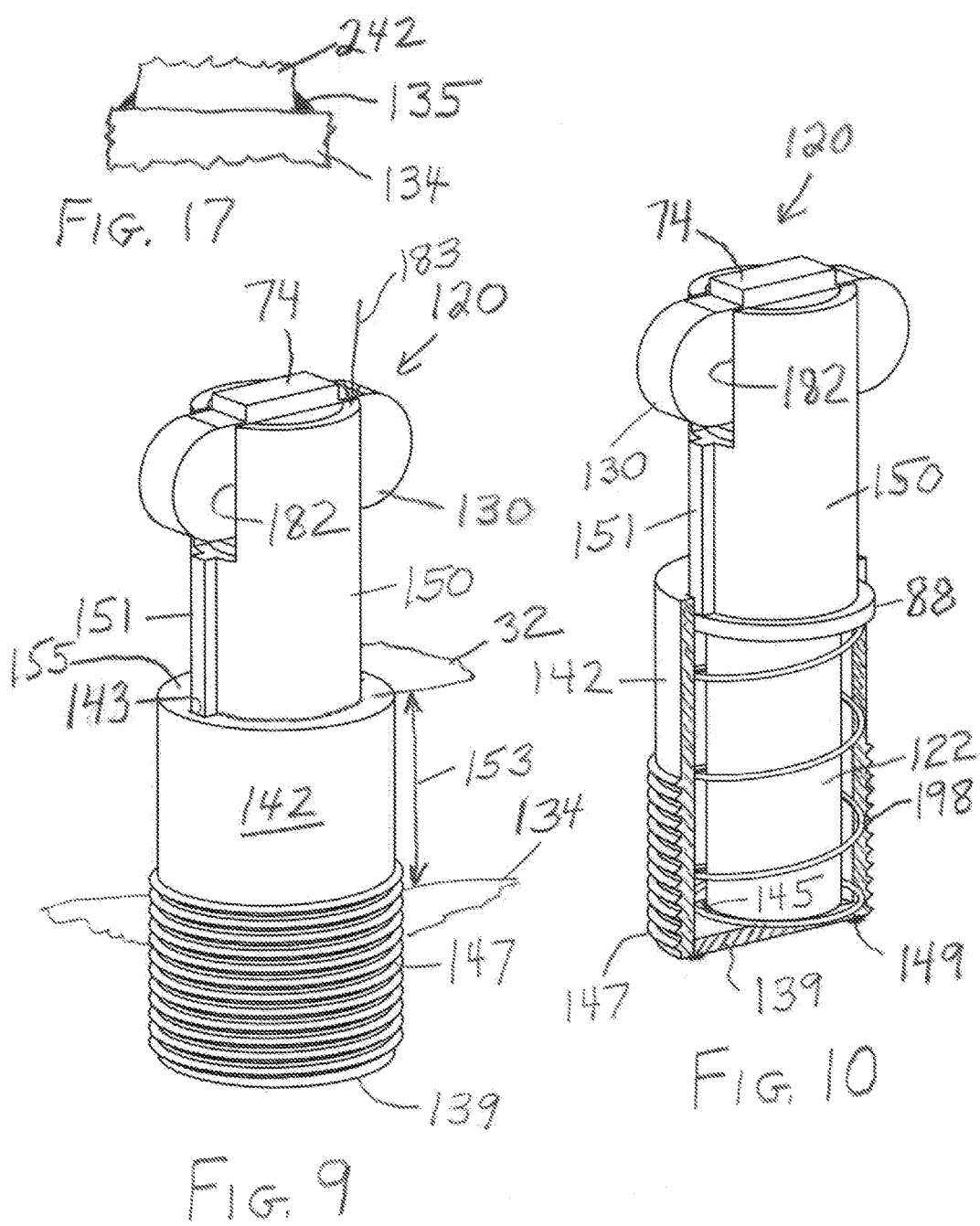

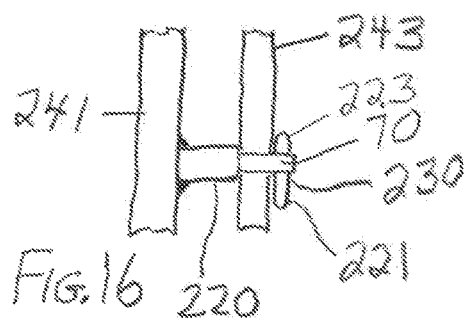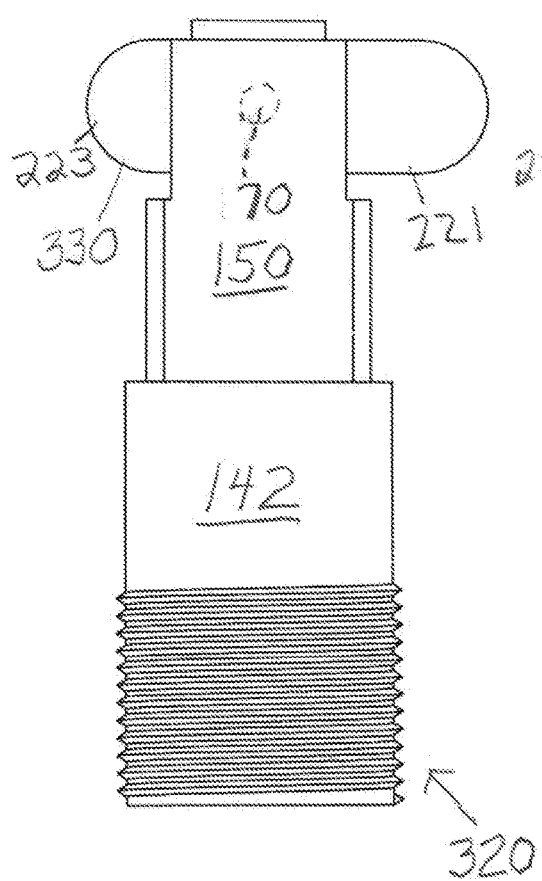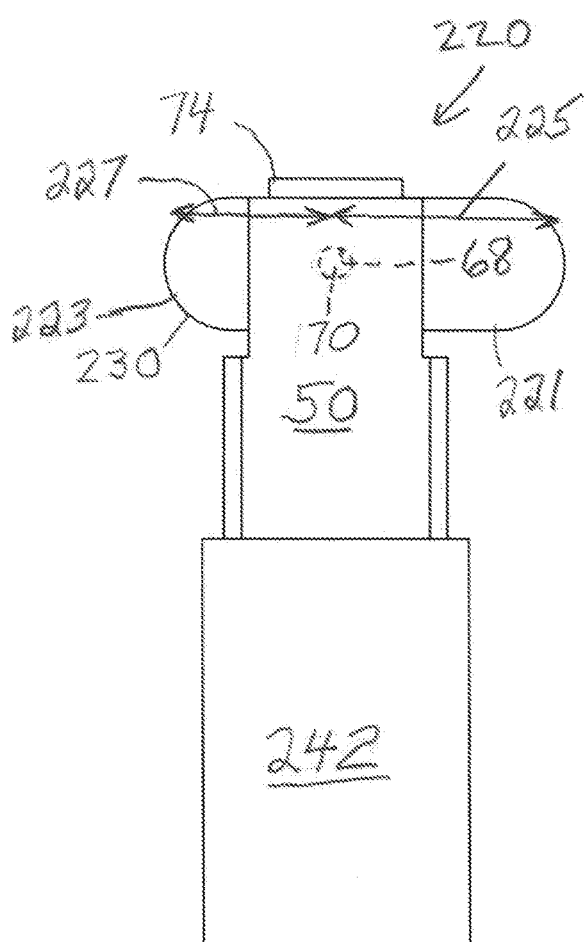

FASTENER

FIELD OF THE INVENTION

The present invention is related generally to fasteners such as may be used, for example, for attaching deck panels to trusses to form platforms or for mounting a wheel to an automobile or for various other uses. More particularly, the present invention is related to a type of fastener wherein the fastener head (or what might be called a nut or wing nut) is held non-detachably to the shank and is collapsible so that the shank may be received in a part for attachment thereof to another part and so as to allow quick connect as well as quick release of the part.

BACKGROUND OF THE INVENTION

U.S. Pat. No. 5,897,300, which along with all other patents and published patent applications discussed herein is incorporated herein by reference, discloses a quick-release bolt securing two parts of a pump housing. It includes a threaded end and a slotted end. A release/lock plate is pivotally attached to the bolt within the slot by a pin which is attached to the bolt. A ball is spring loaded to engage lock detents or release detents to orient the plate. In order to secure the housing halves together, a threaded end of each bolt engages threads in each lug on a first housing half and the plate is placed in the releasing position. The second housing half is mated with the first housing half such that the bolts pass through the lugs thereof. The bolts are then tightened until the plate contacts the lugs on the second housing half. To remove the second housing half, it is said that the bolts need be rotated only about one-half to one-quarter of a turn in order to allow the user to pivot the plate into the releasing position. This fastener does not suitably allow the secure attachment of a deck panel to a part located some distance below the deck panel.

During the erection of platforms or other scaffolding, such as in Applicant's U.S. Pat. Nos. 5,730,248; 5,921,346; 6,003,634; 6,135,240; 6,138,793; 6,227,331; 6,264,002; 6,302,237; 6,386,319; and 6,523,644, all of which are incorporated herein by reference, it is considered desirable that loose nuts or fasteners not be used for connecting decking panels to a platform or scaffolding framework in that such nuts or fasteners may be dropped by workers, and it is also considered desirable to be able to quickly and easily connect and disconnect the panels to and from the framework, using durable fasteners. It is moreover considered desirable that the fasteners remain engaged with the framework so that they may not be susceptible to being dropped by workers.

SUMMARY OF THE INVENTION

It is an object of the present invention to provide a durable and easy to use fastener for quickly connecting one part to another and for quickly disconnecting the parts, without the use of nuts that can be dropped, and with fasteners therefor remaining engaged to one of the parts so that they can not be dropped.

With reference to the corresponding parts, portions, or surfaces of the disclosed embodiments, merely for the purposes of illustration and not by way of limitation, in accordance with certain aspects/embodiments of the present invention, a spring-loaded fastener is provided wherein a nut or head thereof is convertible between a use position for attachment of one part to another part to which the fastener is attached and a collapsed position for detachment of the one part, with the fastener remaining attached to the other part whereby the attachment and detachment can be conducted quickly and without inadvertent dropping of fasteners or fastener parts by workers.

The above and other objects, features, and advantages of the present invention will be apparent from the following detailed description of the preferred embodiment(s) thereof when read in conjunction with the appended drawings wherein the same reference numerals denote the same or similar parts throughout the several views.

BRIEF DESCRIPTION OF THE DRAWINGS

FIG. 2 is a perspective view of the fastener illustrated with its head collapsed (may be called its "original" state).

FIG. 3 is a view similar to that of FIG. 2 of the fastener illustrated with its head positioned to attached one part to another (may be called its "attachment" state).

FIG. 4 is a view similar to that of FIG. 3 partially sectioned.

FIG. 5 is an expanded view of the fastener, with each of its parts shown individually and in perspective.

FIGS. 6, 7, and 8 are sequential views illustrating the use of a tool for quickly moving the head of the fastener from a collapsed position (original state) to a use position for attaching one part to another (attachment state), each figure being a side view of the fastener and a partial section partially schematic view of the tool.

FIGS. 9, 10, and 11 are views similar to those of FIGS. 3, 4, and 5 respectively of an alternative embodiment of the fastener.

FIGS. 12 and 13 are side views of the fastener of FIG. 9 and illustrated in FIG. 12 without threads on a tubular member thereof, illustrating an alternative embodiment of the head therefor.

FIG. 14 is a side view of the tool of FIGS. 6, 7, and 8.

FIG. 15 is an end view of the tool of FIGS. 6, 7, and 8.

FIG. 16 is a schematic view illustrating the attachment of the fastener of FIG. 12 to a pair of cross braces of scaffolding, such attachment also being applicable to the fastener of FIG. 13.

FIG. 17 is a partial side view illustrating the attachment by welding of the tubular member of the fasteners of FIGS. 9 to 13 to a lower of two parts to be attached.

DETAILED DESCRIPTION OF THE PREFERRED EMBODIMENT(S)

Figure 1:
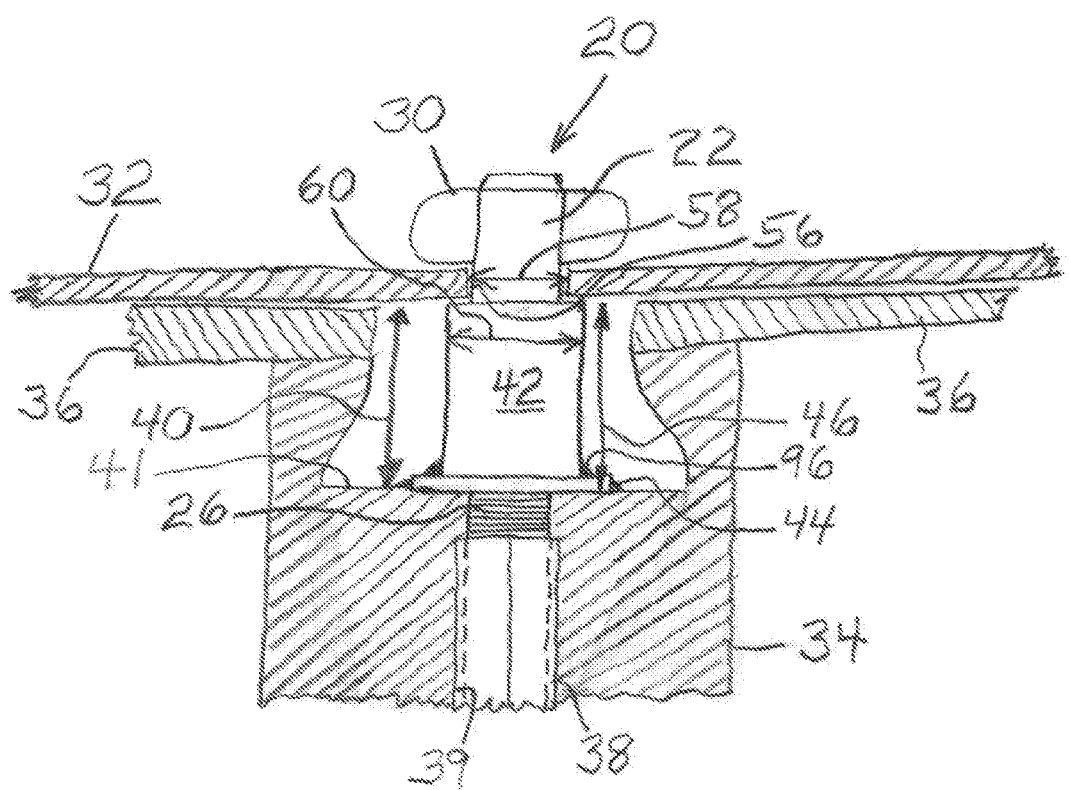
FIG. 1 is a partial side view of a fastener which embodies the present invention and which is illustrated attaching a deck panel to a connector of a pair of trusses, shown schematically and partially and in section, to form a platform.

Referring to FIGS. 1 to 5, there is shown generally at 20 a bolt or fastener whose parts are composed, unless otherwise specified, of stainless steel or other suitable steel or metal or material, and which includes an elongate shank 22 the lower end portion 24 of which is has screw threads 26 and the upper end portion 28 of which is fitted with an elongate head 30 or what may be called a wing nut or nut. The terms "upper" and "lower" and similar terms are intended, for the purposes of this specification and the claims, to be relative terms for ease of description, with the fastener 20 being arbitrarily assigned one or the lower end portion 24 to be threaded (or which in an embodiment may not be threaded) and the opposite or the upper end portion 28 to have the head 30. Thus, for example, even though in a specific application the end portion 24 may be geographically above the end portion 28, it would still be referred to herein, in accordance with their meanings herein as being relative to each other, as the lower end portion. Likewise, if the parts to be attached were side-by-side, the end portions 24 and 28 would still be defined as lower and upper end portions respectively. Moreover, in accordance with the relative meanings of the terms, a lower part, as used herein and in the claims, is one to which the lower end portion 24 is attached, and an upper part, as used herein and in the claims, is one to which the upper end portion 28 is attached.

The fastener 20 is illustrated in FIG. 1 attaching a deck panel 32 to a connector 34 which joins the ends of two trusses 36 for forming a platform. It should be understood that the fastener 20 may instead attach the deck panel 32 directly to a truss 36. An internally threaded member 38, which is tubular and whose outer surface may be six-sided for purposes of stability or otherwise suitably shaped, is suitably positioned within a voided space of and suitably welded to the connector 34. The shank 22 passes through a tubular member 42 (as described hereinafter in greater detail) which serves as an hereinafter discussed spring housing and which rests on the surface 41 of connector 34 and is welded, as by welds 44, or otherwise suitably attached to the connector 34. The lower end portion of the shank 22 passes downwardly through the voided space, and threads 26 on the lower end portion of the shank 22 threadedly engage the internally threaded member 38. It should be noted that the surface 41 is below the upper surface of the trusses 36 on which the deck panels 32 lie by a distance illustrated at 40. The tubular member height, illustrated at 46, is substantially equal to the height 40, for example, about 1⅛ inch. Unless otherwise specifically stated, references herein to dimensions are for exemplary purposes only and not for purposes of limitation, it being understood that the particular dimensions of the fastener will relate to the use for which it is constructed.

The shank 22 is snugly received but freely movable within and extends beyond the lower end of a sleeve 50, whose purpose will be described in greater detail hereinafter, and the sleeve is in turn received in tubular member 42, as discussed in greater detail hereinafter.

In FIGS. 1, 3, and 4, the head or wing nut 30 is in what might be called a use position or the attachment state wherein it may be said to extend normal to the shank 22 and is seen in FIG. 1 in this use position attaching the deck panel 32 to the trusses 36. As will be described in greater detail hereinafter, the head 30, having a width, illustrated at 48 (FIG. 5), which is greater than the diameter, illustrated at 52, of the shank 22 and which is substantially equal to the diameter, illustrated at 54 (FIGS. 2 and 5), of the sleeve 50, is collapsible to the original state shown in FIG. 2 wherein the head 30 may be said to extend longitudinally of the shank 22 and thus substantially within the diameter of the sleeve 50. Holes, illustrated at 56 (one shown), in the deck panel 32 each has a diameter, illustrated at 58, which is slightly larger than the diameter 54 of the sleeve 50 but less then the diameter, illustrated at 60, of the tubular member 42. As a result, when the head 30 is in the collapsed position or original state of FIG. 2, the deck panel 32 may be laid over the trusses 36 with the sleeve 50 received in the respective hole 56 and with the deck panel 32 stably and securely overlying and supported by the tubular member 42, as illustrated in FIG. 1. The head 30 may then be rotated 90 degrees to the use position of FIGS. 1, 3, and 4, as hereinafter discussed, and suitable tightening applied to firmly connect the deck panel 32 to the trusses 36.

For example, for a panel hole diameter 58 of 11/16 inch, the sleeve diameter 54 may be about ⅝ inch, the tubular member diameter 60 may be about ⅞ inch, the head width (maximum, centrally thereof) 48 may be about ⅝ inch, the head length 49 may be about 1⅛ inch, the head thickness 51 may be about ¼ inch, and the shank diameter 52 may be about ½ inch, and the slot depth 23 may be about 1 inch, but it if of course to be understood that fasteners 20 for the same panel hole diameter 58 may have other suitable dimensions.

In order to remove the deck panel 32, the head 30 is returned to the collapsed position or original state of FIG. 2, as hereinafter discussed, after which the deck panel 32 may be lifted off of the sleeve 50 and away, with the sleeve remaining welded or otherwise suitably attached to the framework or truss connector 34 (or, if desired, to a truss) and with the threads 26 of the lower end portion of the shank 22 remaining threadedly engaged with the framework member 38. Thus, desirably, neither the fastener 20 or a nut are susceptible to being dropped by a worker.

The threads 26 on the lower end portion 24 of the shank 22 constitute one embodiment of means for threadedly attaching said lower end portion 24 of said shank 22 to the lower part or member 38. Another embodiment of means for threadedly attaching said lower end portion 24 of said shank 22 to the lower part is illustrated in FIGS. 9, 10, 11, and 13 wherein, as described in greater detail hereinafter, the lower end of a shank is welded or otherwise suitably attached to a tubular member which is in turn threadedly engaged to a lower part. The term "means for threadedly attaching said lower end portion of said shank to the lower part" is accordingly meant, as may be used herein and in the claims, to include each of these embodiments as well as any and all equivalents thereof.

Referring to FIG. 5, the shank 22 has a slot, illustrated at 62, in its upper end and extending radially entirely across the shank 22 and longitudinally of the shank 22 downwardly to define a slot depth, illustrated at 23 (FIG. 5), and dividing the upper end portion 28 of the shank 22 into two facing sections 64. The shank 22 has a longitudinal axis, illustrated at 25 (FIG. 4), and, for the purposes of this specification and the claims, the radial direction, illustrated at 27, is a direction normal to the longitudinal axis 25, and the longitudinal direction, illustrated at 29, is a direction along or parallel to the longitudinal axis 25.

Similarly sized apertures, illustrated at 66, and received in the sections 64 respectively, and a similarly sized aperture, illustrated at 68, is received centrally in the head 30, through the thickness thereof. A suitable pin 70 is received in the three apertures 66 and 68 thereby attaching the head 30 to the shank 22 so that the head 30 is rotatable relative to the upper end of the shank 22, with the slot 62 sized to receive the head 30 to allow such rotation. The head or nut 30 is thus rotatable about the pin 70 between the use position or attachment state of FIGS. 1, 3, and 4 and the collapsed position or original state of FIG. 2. It is considered preferred that the head 30, as shown, be rotatable throughout 360 degrees.

The head or nut 30 has a preferred shape to enable it to be manipulated by a preferred tool, as discussed hereinafter with respect to FIGS. 6, 7, and 8. Thus, the head 30 preferably has semi-oval-shaped end portions 72 connected by an increased width central portion which defines the head width 48 and which defines block portions 74. Compared to the exemplary head width 48 of about ⅝ inch, each block portion 74 has a width, illustrated at 78, of for example about 1/16 inch thereby defining each semi-oval portion width (adjacent the block portions 74), illustrated at 80, of for example about ½ inch. While the semi-oval portions 72 are shown in FIGS. 1 to 11 to be identical or substantially similar, in accordance with an alternative embodiment, one may be longer than the other, as will be discussed hereinafter with respect to FIGS. 12 and 13.

In order to allow minimal threading and unthreading of the shank 22 so as to enable quick movement of the head 30 between the connected or use (attachment state) and the disconnected or collapsed (original state) positions, as will become more apparent hereinafter, the shank 22 is received in the sleeve 50 which is spring-bias engaged to the tubular member 42 as follows.

The sleeve 50 has a pair of diametrically opposed slots, illustrated at 82, in the upper end of its wall which correspond to the slot 62 in the shank 22. The width 80 of each of the head semi-oval portions 72 is less than the inner diameter, illustrated at 86, of the sleeve 50 so that a semi-oval portion may be received within the sleeve 50, as seen in FIG. 2. The length, illustrated at 84, of each of the block portions 74 is also less than the inner diameter 86 of the sleeve 50 so that a block portion 74 may also be received within the sleeve 50, as seen in FIG. 3. For example, for the previous exemplary dimensions, the sleeve inner diameter 86 may be about ½ inch but slightly larger than the shank diameter 52 to snugly but not tightly engage the shank 22, each block portion length 84 may be about 7/16 inch, and each semi-oval portion width 80 may be about ⅞ inch.

As seen in FIG. 2, due to the increased head width provided by the block portions 74, when the head 30 is in the collapsed position (original state), the block portions 74 are received in the sleeve slots 82 so that the sleeve 50 and shank 22 are locked together to rotate together. Thus, during normal use of the fastener 20, the sleeve 50 and shank 22 rotate together during threading and unthreading.

The sleeve lower end is outwardly flanged as by flange 88. The upper end of the tubular member or spring housing 42 is inwardly flanged as by flange 90 so that the inner diameter of the flange 90 is slightly less (for example, by less than about 1/32 inch) than the sleeve outer diameter 54 thus "trapping" the sleeve flange 88 within the spring housing 42 for movement upwardly and downwardly therein. As best seen in FIG. 4, the lower end of the tubular member or spring housing 42 is inwardly flanged as by flange 92 to thereby prevent movement of the lower end of the sleeve 50 beyond the lower end of the spring housing 42. A washer-shaped plate 94 is welded, such as by a pair of spot welds 96 (FIG. 1), or otherwise suitably attached to the lower end of the tubular member 42. It is this plate 94 that is welded as by weld or welds 44 or otherwise suitably attached to the connector 34 or other platform frame member.

A suitable spring 98 is received within the spring housing 42 between the sleeve flange 88 and the lower spring housing flange 92 to spring-bias the sleeve 50 upwardly.

The pin 70 is preferably tubular, having a cylindrical wall thickness of, for example, about 1/32 inch. It is preferably fixedly mounted non-rotatably within the apertures 66 such as, for example, by welding or by other suitable means, and the diameter of the aperture 68 is slightly larger than the pin diameter so that head or nut 30 is snugly but freely rotatable about the pin 70.

As the fastener 20 when substantially loosened is tightened, the shank 22 initially may be said to move downwardly relative to the sleeve 50 (or the sleeve 50 may be said to move upwardly relative to the shank 22) until the attachment of the pin 70 in the apertures 66 is completely covered to thereby protect the attachment of the pin 70 in the apertures 66 from debris. Shortly thereafter, the shank 22 and sleeve 50 will begin moving downwardly together with the spring 98 being progressively compressed, making it harder and harder to push the sleeve 50 against the resistance of the spring 98 as the shank 22 is progressively tightened. The tightening may desirably continue until the distance, illustrated at 100 in FIG. 3, between the nut 30 and the tubular member is equal to about the panel thickness, which may, for example, be about 1/16 to ⅛ inch. The attachment of the pin 70 in the apertures 66 may remain covered as long as the distance 100 between the nut 30 and the tubular member is less than, for example, about ¾ inch, as seen in FIG. 3. In order to continuously seal or protect the attachment of the pin 70 from debris, it is thus considered desirable that this distance 100 remain small enough, such as shown in FIG. 3, to continuously (except when the sleeve 50 is momentarily being pushed downwardly relative to the shank 22 to convert the nut 30 between use and collapsed positions) cover the attachment of the pin 70 when the nut 30 is in either the collapsed or use positions, as seen in FIGS. 2 and 3 respectively.

The more this distance 100 is limited, the quicker the panels 32 may be attached and detached. However, the force of the spring 98 may be too great to keep this distance 100 small enough merely by use of the worker's hands for quick attachment (movement of the nut to the attachment state). In accordance with the present invention, in order to allow attachment of the fastener 20 with minimal loosening of the shank 22, a tool, illustrated at 102 in FIGS. 6, 7, and 8, is preferably used, as described hereinafter.

Starting with the head or nut 30 in the use position of FIG. 4, the nut 30 may be rotated to further threadedly engage the threaded member 38 and to effect tightening of the fastener 20 to the position shown in FIG. 1. In this fully tightened position, the spring 98 is compressed very tightly, and the sleeve 50 cannot normally be moved downwardly to substantially uncover the shank slot 62 so that rotation of the nut 30 to the collapsed position may be effected. As the fastener 20 is loosened, it would normally become easier to move the sleeve 50 downwardly against the force of the spring 98 to substantially uncover the shank slot 62. A suitable compression spring 98 for providing the desired forces may be selected using principles commonly known to one of ordinary skill in the art to which this invention pertains.

In order to be able to move the nut 30 to the collapsed position so that the panel 32 can be removed, the shank 22 is loosened to such an extent that the sleeve 50 can be pushed downwardly by hand against the spring force, thus substantially uncovering the slot 62 at least enough so that the nut 30 can be rotated to the collapsed position (original state). When it is desired to re-attach the panel 32, the sleeve 50 can again be pushed downwardly against the spring force, thus again substantially uncovering the slot 62 at least enough so that the nut 30 can be rotated back to the use position (attachment state) and the shank thereafter tightened to effect a secure attachment of the panel, with the nut 30 again being prevented from movement back to the collapsed position and the sleeve 50 normally prevented from being pushed downwardly enough to effect uncovering of the slot 62. Again, the nut 30 cannot be rotated back to the collapsed position until there has been enough loosening of the shank 22 to allow sufficient downward movement of the sleeve 50 to uncover the shank slot 62. An important key is that it is desirable that only enough loosening need be conducted to allow a worker to move the sleeve 50 downwardly enough to clear or uncover the slot 62 for movement of the nut 30 to the collapsed position (original state) and removal of the panel 32. Such a minimization of turns of the shank 22 for loosening is provided to enable quick detachment of the panel 32. Moreover, for attaching the panel 32, the nut 30 may be returned to the use position (attachment state) without further loosening of the sleeve 50 so as to also enable quick attachment of the panel 32.

While, after desirably only a minimal amount of loosening of the shank 22, a worker may use his or her hands to push downwardly on the sleeve 50 to clear or substantially uncover the slot 62 for movement of the nut 30 to the collapsed position and removal of the panel 32, it is envisioned that a suitable tool may be designed to more easily achieve such movement or to be able to apply greater force so that the distance 100 may be even further minimized for even more quickly moving the nut 30 to the original state and detaching a panel 32. Such a tool may be constructed using similar principles as used for the hereinafter described tool 102 as well as principles commonly known to those of ordinary skill in the art to which the present invention pertains.

A worker may use his or her hands to quickly and easily move the sleeve 50 downwardly to move the nut 30 from the original to the attachment state after the shank 22 has been substantially threadedly received in the connector 34. Referring to FIGS. 6, 7, and 8, there is shown generally at 102 a tool for quickly and easily moving the nut 30 from the original to the attachment shape for attachment of a panel, with the fastener 20 initially threaded to an even greater extent than if the one's hands were used alone to so move the nut 30. The tool 102, which may be composed of a single molded piece of suitable hard strong plastic or composed of other suitable material, has a cylindrical longitudinal outer surface 104, a longitudinal bore, illustrated at 106, sized for passage of the shank 22 and having a surface, and a counterbore, illustrated at 108, defining a circular surface 110 for engaging the upper end of the sleeve 50. While not shown, there is desirably a slope from the surface 110 to the end of the tool 102 to alleviate any interference between the wall of the sleeve 50 and the tool and to thusly allow ease of insertion of the sleeve 50 for its end to be engaged by the tool surface 110. A pair of diametrically opposed slots, illustrated at 112, are provided to accommodate the opposite end portions respectively of the nut or head 30.

The tool 102 has a portion, illustrated schematically at 114, which protrudes or juts inwardly from the bore surface 106 at a location near the end of one of the slots 112. This protruding portion 114 has a suitably sloping surface, illustrated schematically at 116, for suitably engaging the suitably curved surface of the respective end portion of the nut 30, as illustrated in FIG. 7. Suitable shapes of the surface 116 and the nut surface can be determined using principles commonly known to those of ordinary skill in the art to which the present invention pertains. To use the tool 102 to convert from the collapsed to use positions (original to attachment states) of the nut 30, as seen progressively in FIGS. 6, 7, and 8, it is placed over the fastener 20 for receiving the shank 22 in the bore 106 and for receiving the head block portions 76 in the tool slots 112. The upper end of the sleeve 50 is engaged by a flange portion or sleeve engagement surface 110 and downward force applied to the tool 102 against the force of the spring 98 for moving the sleeve 50 downwardly relative to the shank 22. As the shank slot 62 is uncovered to allow free movement of the nut 30, the sloped jutting or engagement or trigger portion 114 engages the suitably curved surface of one of the nut outer portions, as illustrated in FIG. 7, rotating it through 90 degrees to the use position (attachment state) of FIG. 8. The jutting or trigger portion 114 may be located at a distance of, for example, about ¾ inch from the tool end, illustrated at 118. The specific location of the jutting or trigger portion 114 can be determined using principles commonly known to those of ordinary skill in the art to which the present invention pertains. The tool 102 may then be removed. Since a worker can apply greater force with the tool 102 than with his or her hands alone, the tool 102 desirably allows the fastener 20 to be initially threaded to an even greater extent before force is applied to the sleeve 50 for effecting conversion of the nut 30 to the use position (attachment state), thus allowing less tightening and allowing the process of panel attachment to be quicker.

For the convenience and greater efficiency of workers, the tool 102 may be provided with a suitable length, for example, about 2 or 3 feet, so as to minimize the amount of bending over required of workers.

To remove a panel 32, the shank 22 is unscrewed enough so that the sleeve 50 can be pushed downwardly, either with one's hands or with a tool which may be devised as hereinbefore discussed, against the spring force to substantially uncover the shank slot 62 and the nut 30 then rotated 90 degrees to the collapsed position (original state) and the panel 32 then removed. The jutting or nut engagement or trigger portion for such a tool may, for example, be located closer to the end 118 and within a slot 112 and again suitably positioning a flange portion or sleeve engagement surface for suitably engaging the rounded surface of the respective nut outer portion. As previously discussed, such a tool with a suitably positioned nut engagement or trigger portion may be devised using principles commonly known to those of ordinary skill in the art to which the present invention pertains.

Once the panel 32 has been applied to rest on the upper surface of the tubular member 42 with the shank 22 and sleeve 50 received in a hole 56 therein and the nut 30 rotated to the use position, it then may be used as a bolt head to screw the shank 22 further into the threaded member 38 which at the same time urges the sleeve 50 downwardly in the spring housing 42 against the force of the spring 98. The shank 22 is tightly screwed down with the wing nut 30 cinching up against the panel 32 to hold it tightly and securely in place resting on the upper surface of the tubular member 42. As a result, when fully tightened, the nut or bolt head 30 impinges on the lower edges of the sleeve slots 62 to "lock" the nut or head 30 into the use position (attachment state), i.e., so that the nut 30 cannot be returned to the collapsed position (original state) until the shank 22 has been unscrewed sufficiently to allow sufficient downward movement of the sleeve 50 to uncover the shank slots 62. Thus, advantageously, the entire fastener remains fully assembled together and attached to the platform framework throughout the process so that there is no danger of a worker dropping the fastener or any part thereof. The fastener 20 allows minimal threading and unthreading so that attaching and detaching two parts such as a panel to and from a platform framework may be achieved quickly.

Figure 11:
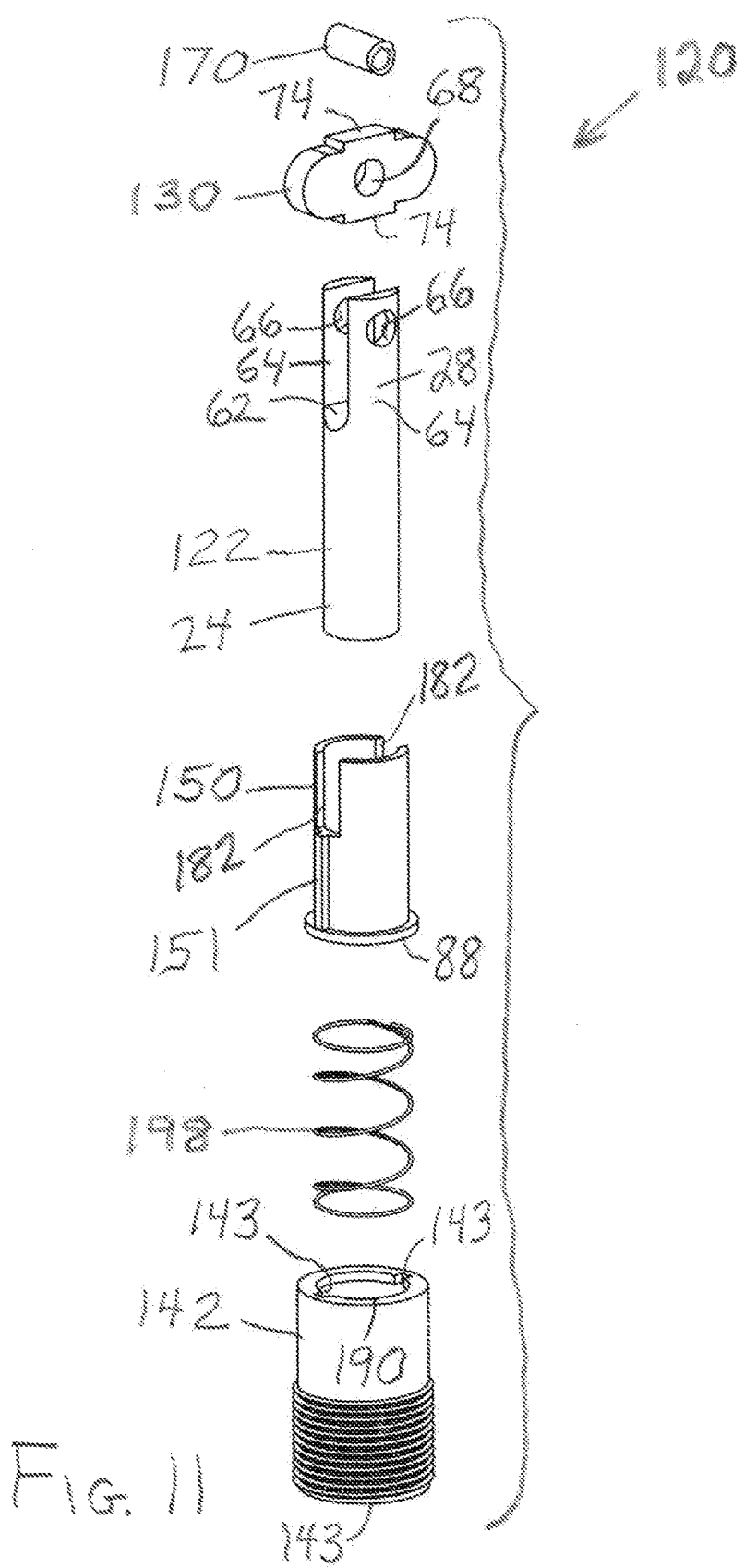

Referring to FIGS. 9, 10, and 11, there is shown generally at 120 a fastener in accordance with an alternative embodiment of the present invention. The fastener 120 includes a shank 122, a nut or head 130, a pin 170, and a spring 198, all similar to the shank 22, nut or head 30, pin 70, and spring 98 of the fastener 20 of the first embodiment of FIGS. 1 to 8, except that the lower end portion of the shank 122 is not threaded for reasons as discussed hereinafter.

Fastener 120 also has a tubular member or spring housing 142 which is similar to tubular member or spring housing 42 of fastener 20 except as otherwise discussed herein. The spring housing 142 has a closed (or at least partially closed) lower wall 139 to which the lower end of the shank 122 is welded, as by spot welds or weld 145, or otherwise suitably attached such as by threads. In order to make the fastener 120, the lower wall 139 (with the shank 122 welded thereto) may be welded or otherwise suitably attached to the cylindrical portion of the spring housing 142, as illustrated by weld 149, after the sleeve 150 and spring 198 have been inserted in the spring housing 142. The spring housing 142 has external threads, illustrated at 147, on its lower end portion for threadedly engaging an internally threaded part to which another part is to be connected. Thus, instead of a lower part being threadedly engaged by threads on the lower end portion of the shank, as in the fastener 20, the lower part is engaged by the threads 147 on the lower end portion of the spring housing 142, with the shank 122 rigidly attached to the spring housing 142 as by weldment 145 (whereby the shank 122 and spring housing 142 may be said to be integral with each other) so that the shank 122 and spring housing 142 rotate as a unit for threadedly engaging the lower part. Thus, the threaded spring housing 142 attached to the shank 122 by the weldment 145 or other suitable attachment serves as another "means for threadedly attaching said lower end portion of said shank to the lower part." The lower end portion of the shank 122 is thusly attachable to the lower part 34 in that it is attached to the spring housing 142 which is in turn attached to the lower part 34. Just as for fastener 20, it can be seen that the fastener 120 can remain threadedly attached to the lower part so that it is not accidentally dropped by workers and so as to make the attachment of an upper part to the lower part quick, similarly as discussed for fastener 20. However, unlike fastener 20 (wherein weldment 44 prevents removal of the fastener 20 from the lower part 34), it can be appreciated that the entire fastener 120 can advantageously be removed from a lower part if desired simply by completely unscrewing the spring housing 142 therefrom (although during normal use, it may be advantageously unnecessary to completely unscrew the spring housing 142).

An alternative tubular member, illustrated at 242 in FIG. 17, is not threaded but is instead permanently attached to a lower part 134 such as by welding, as illustrated by weldment 135.

Fastener 120 also has a sleeve 150 which is similar to sleeve 50 except that it is preferably keyed to the spring housing 142 to allow the sleeve 150 and spring housing are rotatable as a unit. Thus, sleeve 150 desirably has at least one but preferably a pair (only one seen) of diametrically opposed longitudinally extending square (or otherwise suitably shaped) ridges or keys 151 along the outer surface of the sleeve 150 which align with the slots 182 respectively, which are similar to slots 82. The spring housing 142 has a pair of corresponding diametrically opposed square-shaped (or otherwise suitably shaped but which are complementarily-shaped to that of keys 151) notches, illustrated at 143, in its upper flange 190 (otherwise similar to flange 90) for receiving the keys 151 respectively. It should be understood that sleeve 150 may be keyed or attached to the spring housing 142 in other suitable ways.

The tubular member 142 during normal use may remain permanently attached to the lower part 134 as by the spot welds or weld 135 or may remain tightly threadedly attached to the lower part 134 as with threads 147. If threaded, the tubular member 142 may as needed be loosened and of course may be entirely unthreaded and removed. The spring housing 142 may be screwed into a lower part 34 so that there is a fixed distance, illustrated at 153, between the lower part 134 and upper spring housing surface 155 on which an upper part such as a panel 32 is to lie or rest to be attached thereto. This distance 153 may remain fixed during numerous cycles of movement of the nut 130 between the original and attachment states, as the sleeve 150 is moved downwardly against the spring force, either by hand or by use of a tool, each time the upper part 32 is removed from or attached to the lower part 34.

In order to convert the nut 130 between the use and collapsed positions (attachment and original states) for attachment and detachment respectively of the upper part 32, the sleeve 150 is pushed downwardly, as illustrated at 183, by use of a tool such as tool 102 or by use of one's hand, against the force of spring 198 to clear generally the entire length of the slot 62 whereby, as previously discussed with respect to fastener 20, the nut 130 is then free to be rotated between the use and collapsed positions (attachment and original states). When released after the desired position has been obtained, the sleeve 150 is spring biased to return to the position shown in FIGS. 9 and 10 wherein the slot 62 again is sufficiently covered to prevent rotation of the nut 130 to the other position.

Referring to FIGS. 12 and 13, there are shown at 220 and 320 respectively fasteners in accordance with alternative embodiments of the present invention. With the exception of nuts or heads 230 and 330 (which are different from nuts or heads 30 and 130, as discussed hereinafter), fasteners 220 and 320 are similar to fasteners 120, illustrated with fastener 220 having the tubular member 242 of FIG. 17 and with fastener 320 having the threaded tubular member 142 of FIGS. 9 and 10, and with the same or similar parts respectively. With respect to FIGS. 12 and 13, the discussion hereinafter will be with respect to nut or head 230, it being understood that the same discussion (unless otherwise stated herein) will also apply to nut or head 330.

The pin 70 or its aperture 68 defines a fulcrum about which the nut 230 is rotatable, and the nut 230 has a pair of end portions 221 and 223 one 221 of which is longer (and also proportionally has greater weight) than the other 223 as measured from the fulcrum 68. Referring to FIG. 16, one application of the fastener 220 is the rapid attachment of a pair of cross braces or X-braces 241 and 243 of scaffolding, which may, for example, extend from upwardly to downwardly (as these terms are used conventionally relative to the ground) and diagonally relative to each other. The fastener 220 is suitably permanently attached to brace 241 as by weld 244 similarly as weld 44 is used for attachment of fastener 20 in FIG. 1. The nut 230 is used to attach and detach the other brace 243, similarly as the nut 30 is used to attach the panel 32, by rotation about the fulcrum or pin 170 between the use position shown in FIGS. 12 and 16 and the previously discussed collapsed position (seen in FIG. 2).

As can be appreciated from FIG. 16, the longer end portion 221, while the nut 230 is freely rotatable about pin 70, will naturally rotate into a use position wherein the longer end portion faces downwardly toward the ground under the force of gravity, and also will be held in such a use position under the force of gravity, thereby easing the work of workers. What is important is that the longer end portion 221 be substantially longer and weight substantially more than the shorter end portion 223 so that the force of gravity may effectively achieve and hold the use position shown in FIG. 16. In order to achieve such effectiveness, the length, illustrated at 225, of the longer end portion 221 is preferably at least about 130 percent of the length, illustrated at 227, of the shorter end portion 223, whereby the weight of the longer end portion is at least about 130 percent of the weight of the shorter end portion 223.

It should be understood that the nut 230 with the unequal length end portions 221 and 223 may be used instead of nut 30 for the fastener 20 of FIGS. 1 to 5.

It should thus be understood that, while the present invention has been described in detail herein, the invention can be embodied otherwise without departing from the principles thereof, and such other embodiments are meant to come within the scope of the present invention as defined by the appended claims.

What is claimed is:

1. A fastener for connecting upper and lower parts, the fastener comprising:
    a) an elongate shank including a lower end portion which is attachable to the lower part and including an upper end portion terminating in an upper end having a slot therein which extends radially entirely across said shank;
    b) an elongate head which is received in said slot and which has a length greater than a diameter of said shank and which is secured in said slot to said shank to be rotatable between a first position wherein said elongate head extends longitudinally of said shank so that said upper end portion of said shank can be received in an aperture of the upper part and a second position wherein said elongate head extends radially of said shank to prevent the upper part from becoming disengaged from said shank; and
    c) means for locking said elongate head in each of said first and second positions, wherein said means for locking comprises a sleeve in which said shank is received and which sleeve is movable between an upper position in which said slot is partially covered so that said head is locked in one of said first and second positions and a lower position in which said slot is substantially uncovered so that said head is movable between said first and second positions, and said means for locking further comprises a spring which is positioned to spring-bias said sleeve upwardly to partially cover said slot whereby said sleeve can be pushed downwardly to substantially uncover said slot to allow said elongate head to be rotated to one of said first and second positions.

2. A fastener according to claim 1 wherein said shank further includes a lower end portion and threads on said lower end portion for threadedly engaging threads in the lower part.

3. A fastener according to claim 1 wherein said shank further includes a lower end portion, the fastener further comprising a tubular member in which said lower end portion of said shank is at least partially received and is attached to said tubular member, wherein said tubular member is attachable to the lower part.

4. A fastener according to claim 3 wherein said tubular member has threads for threadedly engaging the lower part.

5. A fastener according to claim 3 wherein said sleeve is partially received in said tubular member, the fastener further comprising means for preventing rotation between said sleeve and said tubular member, wherein said means for preventing rotation comprises at least one keyway on one of said sleeve and said tubular member and a key on the other of said sleeve and said tubular member which engages said keyway.

6. A fastener according to claim 1 further comprising an aperture in said elongate head and a pin received in said elongate head aperture for securing said elongate head to said shank and thereby defining first and second elongate portions of said elongate head on opposite sides respectively of said elongate head aperture, the fastener further comprising means utilizing the force of gravity for effecting movement of said elongate head to said second position, wherein said means utilizing the force of gravity for effecting movement of said elongate head to said second position comprises a length of said first elongate portion which is greater than a length of said second elongate portion.

7. A fastener according to claim 1 further comprising a tubular member having an inwardly flanged upper end through which said shank and said sleeve pass and having a lower end which is at least inwardly flanged, wherein said sleeve has a lower flanged end, and wherein said spring is received in said tubular member between said lower flanged end of said sleeve and said lower end of said tubular member.

8. A fastener according to claim 1 wherein said elongate head has a width which is greater than a diameter of said shank.

9. A fastener according to claim 1 wherein said shank slot defines a pair of shank segments, the fastener further comprising a pair of apertures in said segments respectively and a pin received in said pair of apertures in said segments respectively and rotatably connecting said elongate head to said segments, and wherein said sleeve is adapted to cover said apertures in said segments respectively when said head is locked in one of said first and second positions.

10. A fastener according to claim 1 wherein ends of said elongate head are rounded in a manner which allows engagement by a tool for urging said elongate head between said first and second positions.

11. A fastener for connecting upper and lower parts, the fastener comprising:
    a) an elongate shank including an upper end portion terminating in an upper end having a slot therein which extends radially entirely across said shank and including a lower end portion having threads for threadedly engaging the lower part;
    b) an elongate head which is received in said slot and which has a length greater than a diameter of said shank and which is secured to said shank to be rotatable between a first position wherein said elongate head extends longitudinally of said shank so that said shank can be received in an aperture of the upper part and a second position wherein said elongate head extends radially of said shank to prevent the upper part from becoming disengaged from said shank; and
    c) means for locking said elongate head in said second position as said shank is tightened and for thereafter quickly re-positioning said elongate head to said first position, wherein said locking and thereafter quickly re-positioning means comprises a sleeve in which said shank is received and which sleeve has a pair of longitudinally extending diametrically opposed slots in its upper end which are alignable with said shank slot for receiving said elongate head, wherein said elongate head in each of said first and second positions is at least partially receivable in both said shank slot and said sleeve slots, and wherein said locking and thereafter quickly re-positioning means further comprises a spring which is positioned to spring-bias said sleeve upwardly thereby partially covering said shank slot to prevent rotation of said elongate head whereby said sleeve can be pushed downwardly to substantially uncover said shank slot so that said elongate head can be rotated to said first position, whereby the second part may then be lifted from said shank.

12. A fastener according to claim 11 wherein said shank slot defines a pair of shank segments, the fastener further comprising a pair of apertures in said segments respectively and a pin received in said pair of apertures in said segments respectively and rotatably connecting said elongate head to said segments, and wherein said sleeve is adapted such that, as the fastener is tightened, said sleeve slides relative to said shank until it covers said apertures in said segments respectively.

13. A fastener according to claim 11 further comprising an aperture in said elongate head and a pin received in said elongate head aperture for securing said elongate head to said shank and thereby defining first and second elongate portions of said elongate head on opposite sides respectively of said elongate head aperture, the fastener further comprising means utilizing the force of gravity for effecting movement of said elongate head to said second position, wherein said means utilizing the force of gravity for effecting movement of said elongate head to said second position comprises a length of said first elongate portion which is greater than a length of said second elongate portion.

14. A fastener according to claim 11 wherein said elongate head has a width which is greater than a diameter of said shank.

15. A fastener according to claim 11 wherein ends of said elongate head are rounded in a manner which allows engagement by a tool for urging said elongate head between said first and second positions.

16. A fastener comprising:
  a) a tubular member including lower and upper ends having inwardly directed flanges respectively;
  b) a sleeve received in said flange of said upper end of said tubular member and including a lower end having an outwardly directed flange and further including an upper end which has a pair of diametrically opposed slots therein;
  c) a spring received between said sleeve flange and said tubular member lower end flange thereby biasing said sleeve upwardly;
  d) a shank which extends through said sleeve and through said tubular member lower end flange and which includes a threaded lower end portion and which further includes an upper end which has a slot which extends radially entirely across said shank, wherein said sleeve slots and said shank slot are alignable; and
  e) an elongate head attached to said shank to rotate within said shank slot between a first position wherein said elongate head extends longitudinally of said shank and a second position wherein said elongate head extends radially of said shank, wherein said elongate head has a length greater than a diameter of said sleeve, wherein, when said sleeve is in a position wherein it is biased upwardly, said sleeve partially covers said shank slot to prevent movement of said elongate head between said first and second positions, and wherein said sleeve can be pushed downwardly against the force of said spring to substantially uncover said shank slot to allow movement of said elongate head between said first and second positions.

17. A method of attaching an overlying member having an aperture to an underlying structure to which a tubular member is attached with the tubular member supporting a shank, the shank including an upper end having a slot therein which extends radially entirely across the shank, and wherein an elongate head is partially received in the slot and rotatably attached to the shank by a pin, wherein the shank is received in a sleeve which has a lower end within the tubular member and which is biased upwardly by a spring within the tubular member and which has a pair of longitudinal slots in its upper end which are in alignment with the shank slot, wherein the elongate head has a length which is greater than a diameter of the overlying member aperture, the method comprising the steps of:
  a) with the elongate head rotated to a first position wherein the elongate head extends longitudinally of the shank, receiving the shank in the aperture of the overlying member; and
  b) pushing the sleeve downwardly against the force of the spring as needed to substantially uncover the shank slot and rotating the elongate head about the pin to a second position wherein the elongate head extends radially of the shank to thereby block removal of the overlying member.

18. A method according to claim 17 wherein the step of pushing the sleeve downwardly against the force of the spring as needed to substantially uncover the shank slot and rotating the elongate head about the pin to a second position comprises pushing on the sleeve with a flange portion of a tool until the shank slot is substantially uncovered and a trigger portion of the tool effects rotation of the elongate head to the second position.

19. A method according to claim 17 further comprising the steps for detaching the overlying member from the fastener of:
  d) pushing downwardly on the sleeve against the force of the spring to substantially uncover the shank slot and rotating the elongate head to the first position; and
  e) lifting the overlying part away from the fastener.

20. A method of attaching an overlying member having an aperture to an underlying structure to which a tubular member is attached with the tubular member supporting a shank having a threaded lower end portion which threadedly engages a threaded bore in the underlying structure, the shank including an upper end having a slot therein which extends radially entirely across the shank, and wherein an elongate head is partially received in the slot and rotatably attached to the shank by a pin, wherein the shank is received in a sleeve which has a lower end within the tubular member and which is biased upwardly by a spring within the tubular member and which has a pair of longitudinal slots in its upper end which are in alignment with the shank slot, wherein the elongate head has a length which is greater than a diameter of the overlying member aperture, the method comprising the steps of:
  a) with the elongate head rotated to a first position wherein the elongate head extends longitudinally of the shank, receiving the shank in the aperture of the overlying member so that the overlying member rests on the tubular member;
  b) pushing the sleeve downwardly against the force of the spring as needed to substantially uncover the shank slot and rotating the elongate head about the pin to a second position wherein the elongate head extends radially of the shank to thereby block removal of the overlying member; and
  c) with the sleeve released, threadedly tightening the shank as needed.

21. A method according to claim 20 wherein the step of pushing the sleeve downwardly against the force of the spring as needed to substantially uncover the shank slot and rotating the elongate head about the pin to a second position comprises pushing on the sleeve with a flange portion of a tool until the shank slot is substantially uncovered and a trigger portion of the tool effects rotation of the elongate head to the second position.

22. A method according to claim 20 further comprising the steps for detaching the overlying member from the fastener of:
   d) loosening the shank as needed and pushing downwardly on the sleeve against the force of the spring to substantially uncover the shank slot and rotating the elongate head to the first position; and
   e) lifting the overlying part away from the fastener.

23. A fastener for connecting upper and lower parts, the fastener comprising:
   a) an elongate shank including a lower end portion which is attachable to the lower part and including an upper end portion terminating in an upper end having a slot therein which extends radially entirely across said shank;
   b) an elongate head which is received in said slot and which has a length greater than a diameter of said shank and which is secured in said slot to said shank to be rotatable between a first position wherein said elongate head extends longitudinally of said shank so that said upper end portion of said shank can be received in an aperture of the upper part and a second position wherein said elongate head extends radially of said shank to prevent the upper part from becoming disengaged from said shank; and
   c) means utilizing the force of gravity for effecting movement of said elongate head to said second position, wherein said means utilizing the force of gravity for effecting movement of said elongate head to said second position comprises a length of said first elongate portion which is greater than a length of said second elongate portion.

* * * * *